United States Patent [19]

Hara et al.

[11] Patent Number: 4,611,897
[45] Date of Patent: Sep. 16, 1986

[54] SEGMENT INDICATION DEVICE

[75] Inventors: Masahara Hara, Tokyo; Toshio Dobashi, Yokohama, both of Japan

[73] Assignee: Nippon Kogaku K. K., Tokyo, Japan

[21] Appl. No.: 739,068

[22] Filed: May 29, 1985

[30] Foreign Application Priority Data

Jun. 5, 1984 [JP] Japan .............................. 59-83217[U]

[51] Int. Cl.⁴ ......................... G03B 17/18; G09G 3/04
[52] U.S. Cl. .................................. 354/475; 354/289.1; 340/756; 340/815.04
[58] Field of Search ................ 354/475, 289.1, 289.12; 340/756, 762, 815.04; 40/447–451; D20/12

[56] References Cited

U.S. PATENT DOCUMENTS 3,903,519  9/1975  Zega ............................... 340/815.04

FOREIGN PATENT DOCUMENTS 24097  2/1977  Japan .................................... 340/756

Primary Examiner—William B. Perkey
Attorney, Agent, or Firm—Shapiro and Shapiro

[57] ABSTRACT

A device for indicating characters by selective activation of plural segments is arranged along two vertically adjoining rectangles with a horizontal common side therebetween. The device comprises a first pair of segments and a second pair of segments. The first pair of segments includes an upper segment and a lower segment separated in the middle of the right-hand vertical side of the upper one of the rectangles. Each segment is so shaped as to at least partly lie along the right-hand vertical side of the upper rectangle. •

The second pair of segments includes an upper segment and a lower segment separated in the middle of the left-hand vertical side of the lower one of the rectangles. Each segment is so shaped as to at least partly lie along the left-hand vertical side of the lower rectangle.

8 Claims, 6 Drawing Figures

F I G. 1
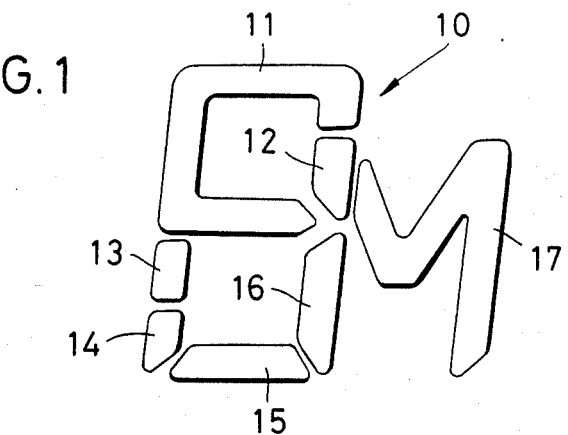
F I G. 2
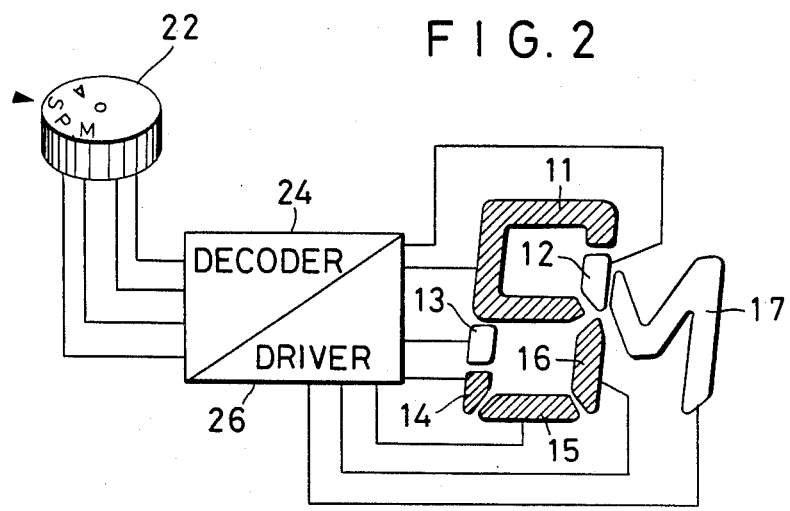
F I G. 3
| SEGMENTS<br>DISPLAYES<br>CHARACTORS | 11 | 12 | 13 | 14 | 15 | 16 | 17 |
|---|---|---|---|---|---|---|---|
| A | 1 | 1 | 1 | 1 | 0 | 1 | 0 |
| S | 1 | 0 | 0 | 1 | 1 | 1 | 0 |
| P | 1 | 1 | 1 | 1 | 0 | 0 | 0 |
| M | 0 | 1 | 0 | 0 | 0 | 1 | 1 |

FIG. 4
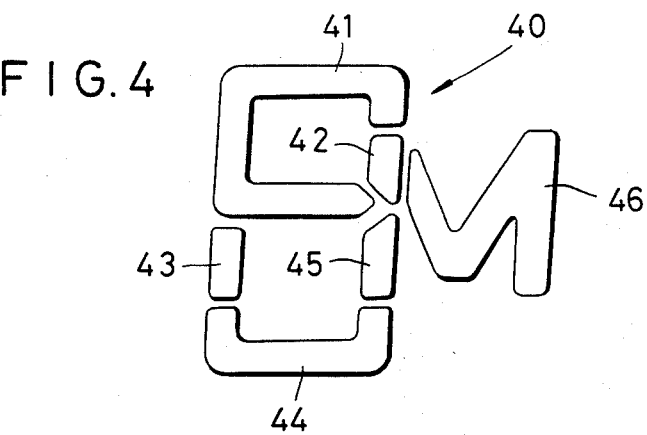
FIG. 5
| SEGMENTS<br>DISPLAYED<br>CHARACTORS | 41 | 42 | 43 | 44 | 45 | 46 |
|---|---|---|---|---|---|---|
| A | 1 | 1 | 1 | 0 | 1 | 0 |
| S | 1 | 0 | 0 | 1 | 1 | 0 |
| P | 1 | 1 | 1 | 0 | 0 | 0 |
| M | 0 | 1 | 0 | 0 | 1 | 1 |
FIG. 6
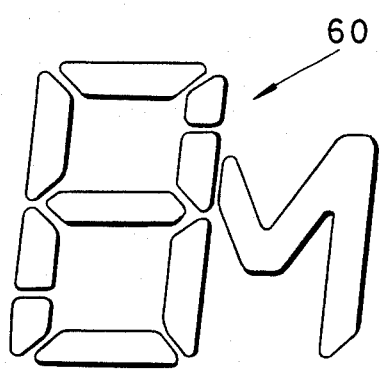

4,611,897

SEGMENT INDICATION DEVICE

BACKGROUND OF THE INVENTION

1. Field of the Invention

The present invention relates to a segment indication device containing plural segments to be selectively activated to indicate a character pattern, and more particularly to such segment indication device adapted for use in the finder of a camera for indicating an exposure control mode.

2. Description of the Prior Art

A numeral indicating device, with seven segments for indicating numerals 0 to 9, is already well known and has been employed, in the field of photographic cameras, for indicating the state of exposure or the exposure control mode. The U.S. Pat. No. 3,982,254 discloses a camera provided with an indicating system utilizing such indicating devices for indicating letters or symbols for identifying various information for photographing. In said system a letter "F" indicating a lens aperture value or a letter "S" indicating a shutter speed is indicated by selective activation of the segments of said indicating device.

The above-mentioned prior art technology proposes a method of utilizing an ordinary indicating device, which is used for indicating numerals, also for indicating letters, thereby enabling identification of the indicated information. However, in recent cameras, particularly those with plural exposure control modes, it is required to indicate a selected mode also in the finder. For example, it is required to indicate a letter "A" indicating aperture-priority automatic exposure control mode, "S" indicating shutter-speed priority automatic exposure control mode, or "P" indicating programmed automatic exposure control mode.

In conventional cameras, these letters are indicated by respective indicating devices which are arranged in a mode display position in the viewing field of the finder. There is consequently required a large space for indicating various exposure control modes, thus leading to a larger dimension of the entire apparatus and involving inconvenience in use since the point of sight has to be moved relatively widely in order to cover said mode display position in the finder.

Also in case of indicating letters "A", "S", "P" etc., with the conventional 7-segment pattern, the numeral "5" for example cannot be distinguished from the letter "S".

SUMMARY OF THE INVENTION

An object of the present invention is to provide a segment indication device suitable for identification and indication of various exposure control modes.

Another object of the present invention is to provide an exposure control mode indicating apparatus in which the position of said indication is stationary.

Still another object of the present invention is to provide a segment indication element allowing the user to clearly distinguish a letter "S" from a numeral "5".

BRIEF DESCRIPTION OF THE DRAWINGS

FIGS. 1 to 3 illustrate a first embodiment of the present invention, wherein FIG. 1 is a plan view of a segment indication device; FIG. 2 is a schematic circuit diagram of an exposure control mode indicating apparatus; and FIG. 3 is a chart showing the function thereof;

FIGS. 4 and 5 illustrate a second embodiment of the present invention, wherein FIG. 4 is a plan view of a segment indication device; and FIG. 5 is a chart showing the function thereof; and FIG. 6 is a plan view of a segment indication device constituting a third embodiment of the present invention.

DESCRIPTION OF THE PREFERRED EMBODIMENTS

Now the present invention will be clarified in detail by embodiments thereof shown in the attached drawings.

FIG. 1 shows a segment indication device for discriminating the photographing mode in a camera with four exposure control modes, i.e. aperture-priority automatic exposure control mode, shutter speed-priority automatic exposure control mode, programmed automatic exposure control mode and manual exposure control mode.

The segment indication device 10 is provided with seven segments 11–17 which are respectively composed of light-emitting diodes or liquid crystal display units and are electrically driven to cause optical changes. The segments 11–16 are arranged along a pattern of numeral "8" while the segments 12, 16 and 17 are arranged along a pattern of letter "M" indicating manual mode. The indication device 10 is so designed, in the shape and arrangement of segments, as to be most suitable for indicating four letters "A", "S", "P" and "M" representing the abovementioned four exposure control modes, and is therefore different from the conventional indication devices designed for numeral indication. Of two square loops vertically arranged to constitute the pattern of numeral "8", the upper one is composed of two segments 11, 12 while the lower loop is composed of four segments 13, 14, 15, 16 excluding the common portion with the upper loop. The boundaries between the segments 11 and 12 are positioned at the center of the right-hand vertical side of the upper loop and between said right-hand vertical side and lower horizontal side which is also included in the lower loop. Consequently the right-hand vertical side of the upper loop is composed of two segments. Also the left-hand vertical side of the lower loop is composed of two segments 13, 14, and the lower horizontal side and the right-hand vertical side of the lower loop are composed of the segments 15 and 16. The segments 12, 16, in said right-hand vertical sides constitute a part of the letter "M", the remainder of which is composed of the segment 17.

As shown in FIG. 2, an exposure control mode indicating apparatus is composed of a segment indication device 10 shown in FIG. 1; an exposure control mode selector 22 having four positions A, S, P and M for respectively selecting the aperture-priority automatic exposure control mode, shutter speed-priority automatic exposure control mode, programmed automatic exposure control mode or manual exposure control mode; a letter indicating decoder 24 for converting a letter information corresponding to the exposure control mode selected by said mode selector 22 into a binary code; and a driver 26 connected through lead wires to the segments of the segment indication device for selectively turning on the segments in response to the output signal from the letter indicating decoder 24.

The function of the above-described indicating apparatus will be explained in the following in relation to FIG. 3, showing the relationship between the binary code output of the decoder 24 and the letter indicated by the segment indication device 10.

When the mode selector 22 is matched to the position S, the corresponding letter information for the letter "S" is converted in the decoder 24 into a binary output code, in response to which the driver 26 turns on the segments 11, 14, 15 and 16 of the indication device 20, whereby a letter "S" as shown in FIG. 2 is indicated in the finder or outside the camera.

Then, when the mode selector 22 is matched to the position A, the segments 11, 12, 13, 14 and 16 are turned on to indicate a letter "A".

When the selector 22 is matched to the position P, the segments 11, 12, 13 and 14 are turned on to a letter "P", and, at the position M, the segments 12, 16 and 17 are turned on to indicate a letter 37 M".

A segment indication device 40 shown in FIG. 4 is composed of six segments, one less than in the device 10 shown in FIG. 1. Segments 41, 42 constituting the upper loop of numeral "8" are arranged the same as in the embodiment shown in FIG. 1. However the lower loop is composed, except the common part thereof with the upper loop, of three segments 43, 44, 45, and left-hand vertical side thereof is divided into the segments 43, 44 at the approximate center, and the right-hand vertical side is divided into the segments 44 and 45 at the approximate center.

The indication device 40 is driven by a driver, similar to the driver 26 shown in FIG. 2, in response to output signals shown in FIG. 5.

A letter "A" is indicated by the activation of the segments 41, 42, 43 and 45, a letter "S" by the segments 41, 44 and 45, a letter "P" by the segments 41, 42 and 43, and a letter "M" by the segments 42, 45 and 46, in the finder or outside the camera.

In a segment indication device 60 shown in FIG. 6, the upper and lower loops of numeral "8" have substantially rotary symmetrical forms, wherein the right-hand vertical side of the upper loop and the left-hand vertical side of the lower loop are respectively composed of two segments. In this manner it is rendered possible to indicate all the numerals "0" to "9" in addition to the letters "A", "S", "P" and "M", wherein all the displayed patterns have mutually different shapes.

We claim:

1. In a camera having a mode selector capable of selecting a plurality of exposure control modes including a shutter speed priority mode, an aperture priority mode, and a program mode, a device for distinguishing and indicating the selected mode, comprising:

plural segments arranged along two vertically adjoining rectangles with a horizontal common side therebetween, said plural segments including a first pair of segments having an upper segment and a lower segment separated in the middle of the right-hand vertical side of the upper one of said rectangles and constituting the right-hand vertical side of said upper rectangle and a second pair of segments having an upper segment and a lower segment separated in the middle of the left-hand vertical side of the lower one of said rectangles and constituting the left-hand vertical side of said lower rectangle; and means for indicating a character S by driving said plural segments excluding said lower segment of said first pair of segments and said upper segment of said second pair of segments when said shutter speed priority mode is selected, indicating a character A by driving said plural segments excluding every segment corresponding to the lower horizontal side of said lower rectangle when said aperture priority mode is selected, and indicating a character P by driving said plural segments excluding every segment corresponding to the lower horizontal and the right-hand vertical sides of said lower rectangle when said program mode is selected.

2. A device according to claim 1, wherein said plurality of exposure control modes includes a manual mode, and further comprising another segment disposed to the right of said rectangles and means for indicating a character M by driving said further segment together with segments at the right-hand vertical side of said rectangles.

3. A device according to claim 1, wherein said upper segment of said first pair of segments comprises a substantially C-shaped segment extending from the right-hand vertical side of said upper rectangle, through the upper horizontal side, the left-hand vertical side thereof, and said common side.

4. A device according to claim 3, wherein said lower segment of said second pair of segments comprises a substantially U-shaped segment extending from the left-hand vertical side of said lower rectangle, through the lower horizontal side thereof, to the right-hand vertical side thereof.

5. A device for indicating characters, comprising:

first character indicating means including plural segments arranged along two vertically adjoining rectangles with a horizontal common side therebetween, said plural segments including a first pair of segments having an upper segment and a lower segment separated in the middle of the right-hand vertical side of the upper one of said rectangles, each segment of said first pair being so shaped as to at least partly lie along the right-hand vertical side of said upper rectangle, and a second pair of segments having an upper segment and a lower segment separated in the middle of the left-hand vertical side of the lower one of said rectangles, each segment of the second pair being so shaped as to at least partly lie along the left-hand vertical side of said lower rectangle; and second character indicating means for indicating a character M, including at least one segment disposed along a left-hand vertical line of the character M which is common to the right-hand sides of said upper and lower rectangles.

6. A character indicating device according to claim 5, further comprising means for indicating a character S by driving said plural segments excluding said lower segment of said first pair of segments and said upper segment of said second pair of segments.

7. A character indicating device according to claim 5, wherein said upper segment of said first pair of segments comprises a substantially C-shaped segment extending from the right-hand vertical side of said upper rectangle through the upper horizontal side, the left-hand vertical side thereof, and said common side.

8. A character indicating device according to claim 7, wherein said lower segment of said second pair of segments comprises a substantially U-shaped segment extending from the left-hand vertical side of said lower rectangle, through the lower horizontal side thereof, to the right-hand vertical side thereof.

* * * * *